United States Patent Office 3,576,809
Patented Apr. 27, 1971

1

3,576,809
**2-SUBSTITUTED DERIVATIVES OF
6-METHOXYQUINOLINE**
Dale Adrian Stauffer, Elkhart, Ind., assignor to Miles
Laboratories, Inc., Elkhart, Ind.
No Drawing. Filed May 6, 1968, Ser. No. 727,069
Int. Cl. C07d 51/70
U.S. Cl. 260—268                              3 Claims

ABSTRACT OF THE DISCLOSURE 2 piperazinyl-6-methoxyquinolines are prepared by reacting a 2-halo-6-methoxyquinoline with a suitable amine, piperazine or piperidine.

---

This invention relates to a novel series of chemical compounds having beneficial properties. More particularly, this invention relates to new 2-substituted derivatives of 6-methoxyquinoline which have demonstrated beneficial pharmacological properties, especially in the alleviation of depressive states. The invention also relates to a process for the preparation of these novel compounds.

The new compounds of this invention may be represented by the structural formula:

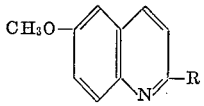

in which R is a member selected from the group consisting of

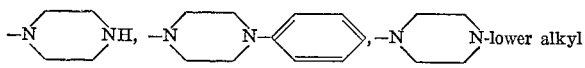

Compounds of this invention may be prepared in the form of a free base or in the form of an acid addition salt. Preferably, non-toxic pharmacologically acceptable acid addition salts are formed. These acid addition salts may be prepared from mineral acids, such as halogen acids or sulfuric acid, or organic acids, such as citric acid, maleic acid, oxalic acid and other similar acids. Preparation of these acid addition salts will be described in subsequent detailed examples and will not, therefore, be set forth at this point.

Compounds of this invention are readily prepared by reacting a 2-halo-6-methoxyquinoline with a suitable compound, such as piperazine, phenylpiperazine, piperidine, dilower alkylamine, etc. Reaction conditions for this preparation are not considered critical. Advantageously, reactants, in a suitable solvent, are heated under reflux for several hours to permit completion of the reaction. Although heating under reflux is preferred, lower temperatures may be utilized. Solvents which are substantially inert under these reaction conditions are preferably used. For example, solvents which are considered satisfactory include toluene, a xylene or a mixture of xylenes.

A precipitate is formed in this reaction which is beneficially treated with an aqueous solution of a strong inorganic acid and then with an aqueous solution of a strong inorganic base which neutralizes the acid and precipitates the desired free base form of the novel compound. Examples of sunitable strong inorganic acids include hydrochloric, and sulfuric acids, and suitable strong inorganic bases include sodium hydroxide and potassium hydroxide.

Preparation of the starting compound 2-halo-6-methoxyquinoline was described by Cohen et al., Proc. Roy. Soc. (London) B 108, 130–7 (1931). The preparation of the novel compounds of this invention may be illustrated by the following chemical equation:

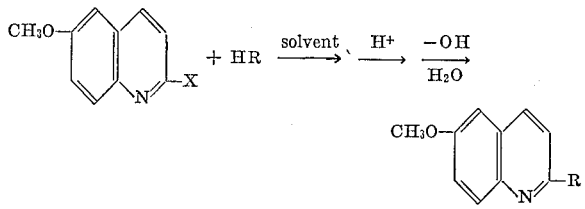

In this equation X is a halogen.

The novel compounds of this invention have demonstrated beneficial pharmacological properties. More particularly, these compounds in therapeutically effective amounts demonstrate activity as antidepressants.

Medications may be prepared including at least one of the novel compounds of this invention as an active ingredient in the form of the free base or pharmacologically acceptable acid addition salt thereof. These medications may be conveniently prepared by combining the active ingredient with a pharmacuetical vehicle including components selected from the fillers, carriers, extenders, excipients and the like generally used in pharmaceutical formulations. Medications may be prepared in the solid state as tablets or capsules, or in the liquid state as suspensions or solutions. Similar dosage forms suitable for oral, rectal, peritoneal, or other convenient means of administration can also be provided. The pharmaceutical vehicle may also include common diluents or tableting adjuncts such as cellulose powder, corn starch, lactose, talc and such, used according to accepted pharmaceutical manufacturing practices. Unit dosages (a specific weight, such as mg. or g.) of active ingredient in the medication may be varied so that an adequate amount is present to provide a desired therapeutic dose without untoward side effects. A dose is considered as a ratio of the weight of active ingredient administered to a patient's body weight, usually expressed as mg./kg., and a therapeutic dose is a dose capable of producing a desired therapeutic result.

The novel compounds of ths invention were observed to have beneficial antidepressant activity when administered to groups of reserpine-depressed mice. The activity of these compounds was evaluated substantially according to the method of Chen and Bohner (J. Pharmacol. Exper. Therap. 131:179, 1961). A medication including 6-methoxy-2-(1-piperazinyl)quinoline maleate as an active ingredient was administered intraperitoneally to a group of test mice 3 hours after they had received reserpine. This medication, in doses ranging from 3.1 to 31 mg./kg. of active ingredient, antagonized the ptotic effects of the reserpine. The antireserpine effects were observed to be dose-dependent in magnitude, immediate and long-lasting. This novel compound of the invention appeared to be about three times more potent than imipramine.

Lethal dose was determined by administering controlled doses of a similar medication including 6-methoxy-2-(1-piperazinyl)-quinoline maleate intraperitoneally to a group of mice. The treated mice were observed for adverse effects and recovery time. An $LD_{50}$ of 81 mg./kg. was observed for this medication.

This invention will be further understood by reference to the following examples which are provided as illustrations and are not intended to be construed as limitations upon the invention, which invention is properly defined in the claims appended hereto.

EXAMPLE 1

6-methoxy-2-(1-piperazinyl)quinoline monohydrate

A mixture of 2-chloro-6-methoxyquinoline (15.0 g., 0.0775 mole) Cohen, Cooper and Marshall., Proc. Roy. Soc. (London) B108, 130–7 (1931) and piperazine (13.4 g., 0.155 mole) in 25 ml. of toluene was heated under reflux for 5 hours. A clear solution formed at first, and a syrupy material, which subsequently solidified, separated out during the heating. The mixture was cooled and shaken with 300 ml. of water, 200 ml. of ether and excess hydrochloric acid. The insoluble material was separated from the mixture by filtration and washed with ether and water. The aqueous portion was separated, clarified with charcoal and treated wtih excess potassium hydroxide. The solid free base was collected and washed with water. The crude product was dissolved in hot aqueous ethanol, clarified with charcoal and recrystallized. White crystals were collected, washed with water and dried at 50° C. The 6-methoxy-2-(1-piperazinyl)quinoline monohydrate (11.3 g.) melted at 102–3°.

*Analysis.*—Calcd. for $C_{14}H_{17}N_3O \cdot H_2O$ (percent): C, 64.34; H, 7.33; N(basic) (2), 10.72; N(total), 16.08. Found (percent): C, 64.28; H, 7.01; N(basic), 10.65; N(total), 16.16.

EXAMPLE 2

6-methoxy-2-(1-piperazinyl)quinoline maleate 6-methoxy - 2 - (1 - piperazinyl)quinoline monohydrate (10.5 g., 0.04 mole) was dissolved in 100 ml. of hot 2-propanol, and a solution of maleic acid (4.7 g., 0.04 mole) in 50 ml. of hot 2-propanol was added. After the mixture had cooled, cream-colored crystals were collected, washed with cold 2-propanol and dried in an oven at 100° C. The methoxy-2-(1-piperazinyl)quinoline maleate (13.2 g.) melted at 180–1° C. (decomp.).

*Analysis.*—Calcd. for $C_{18}H_{21}N_3O_5$ (percent): N(basic) (2), 7.80; N(total), 11.69; N.E., 179.9. Found (percent): N(basic), 7.73; N(total), 11.68; N.E., 179.8.

EXAMPLE 3

2-(4-methyl-1-piperazinyl)-6-methoxyquinoline

A mixture of 2-chloro-6-methoxyquinoline (15.0 g., 0.078 mole), 1-methylpiperazine (15.5 g., 0.156 mole) and 25 ml. of toluene was heated to reflux. An exothermic reaction occurred, and vigorous reflux was maintained by the addition of a low heat. After twenty minutes the exothermic reaction was over, and the mixture was heated under reflux for seven hours in all. A syrupy material slowly separated out during the heating. The mixture was cooled and agitated with 50 ml. of water, 50 ml. of ether and 15 ml. of concentrated hydrochloric acid. The insoluble solid material was removed by filtration and washed with ether and water. The aqueous portion of the filtrate and washings was separated and clarified with carbon. Then excess aqueous sodium hydroxide was added. A solid free base was formed, collected, washed with water and dried. The free base (14.1 g., M.P. 120–1° C.) was recrystallized from aqueous ethanol. The product (13.2 g., 66%) melted at 121–2° C.

*Analysis.*—Calcd. for $C_{15}H_{19}N_3O$ (percent): N, (basic), 10.80; N (total), 16.33. Found (percent): N (basic), 10.98; N (total) 16.07.

EXAMPLE 4

2-(4-methyl-1-piperazinyl)-6-methoxyquinoline maleate 2-(4 - methyl-1-piperazinyl)-6-methoxyquinoline (12.6 g., 0.049 mole) was dissolved in 100 ml. of hot 2-propanol, and a solution of maleic acid (5.7 g., 0.049 mole) in 50 ml. of hot 2-propanol was added. The crystals which separated on cooling were collected, washed wtih 2-propanol and dried. The salt amount to 15.4 g. and melted at 169–170° C.

*Analysis.*—Calcd. for $C_{15}H_{19}N_3O \cdot C_4H_4O_4$ (percent): N (basic), 7.53; N (total), 11.25; N. E., 186.7. Found (percent): N (basic), 7.61; N (total), 11.08; N. E. 186.0.

What is claimed is:

1. A compound selected from compounds of the formula:

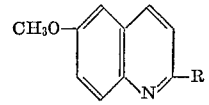

in which R is

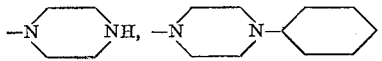

or

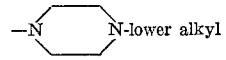

and pharmacologically acceptable salts thereof.

2. A compound according to claim 1 which is 6-methoxy-2-(1-piperazinyl)quinoline.

3. A compound according to claim 1 which is 2-(4-methyl-1-piperazinyl)-6-methoxyquinoline.

References Cited

UNITED STATES PATENTS

| | | | |
|---|---|---|---|
| 1,747,531 | 2/1930 | Schulemann et al. | 260—288 |
| 1,903,196 | 3/1933 | Schulemann et al. | 260—288 |
| 3,272,824 | 9/1966 | Ebetino | 260—268X |
| 3,493,570 | 2/1970 | Plostnieks | 260—289X |

OTHER REFERENCES

British Specification 1,107,652, Abstracted in Chem. Abstr., vol. 69, col. 52179 (1968).

Fourneau, Abstr. in Chem. Abstr., vol. 24, col. 2749–51 (1930).

DONALD G. DAUS, Primary Examiner

U.S. Cl. X.R.

260—288, 289, 293; 424—250, 258